United States Patent [19]
Benassi

[11] Patent Number: 6,116,645
[45] Date of Patent: Sep. 12, 2000

[54] STEERING ASSEMBLY FOR A WORK VEHICLE

[75] Inventor: Gian C. Benassi, Modena, Italy

[73] Assignee: New Holland North America, Inc., New Holland, Pa.

[21] Appl. No.: 09/058,928

[22] Filed: Apr. 13, 1998

[30] Foreign Application Priority Data

Apr. 22, 1997 [IT] Italy ................................ BO97A0238

[51] Int. Cl.$^7$ .................................................. B62D 7/15
[52] U.S. Cl. ................ 280/771; 280/93.506; 280/93.51; 280/93.502; 180/76
[58] Field of Search .................................... 280/771, 773, 280/89.12, 93.502, 93.51, 93.511, 124.11, 86.1, 86, 98, 90, 93.506; 180/424, 76; 267/64.17

[56] References Cited

U.S. PATENT DOCUMENTS

| | | | |
|---|---|---|---|
| 2,297,591 | 9/1942 | Urich | 280/93.51 |
| 3,073,616 | 1/1963 | Stump | 280/93.51 |
| 3,107,103 | 10/1963 | Lely | 280/87 |
| 3,700,257 | 10/1972 | Hurlburt | 280/87 |
| 3,768,825 | 10/1973 | Magnusson | 280/93.51 |
| 3,870,335 | 3/1975 | Schulz | 280/90 |
| 4,708,363 | 11/1987 | Hata | 280/771 |
| 4,969,533 | 11/1990 | Holm et al. | 180/273 |
| 5,364,114 | 11/1994 | Petersen | 280/95.1 |
| 5,474,144 | 12/1995 | Tarng | 180/76 |
| 5,564,680 | 10/1996 | Sano et al. | 267/64.17 |
| 5,890,558 | 4/1999 | Keegan | 280/773 |

*Primary Examiner*—Lanna Mai
*Assistant Examiner*—Hau Phan
*Attorney, Agent, or Firm*—Larry W. Miller; J. William Stader; Frank A. Seemar

[57] ABSTRACT

A steering assembly for a work vehicle having a supporting frame is disclosed wherein the steering assembly includes a steerable front axle having an axle defined longitudinally by end portions rocking about respective substantially vertical axes. Each end portion supports a rotatable wheel. The front axle further has a box body connected rigidly to the axle to connect it to the frame in freely rotating manner via the interposition of a first spherical joint. A connecting unit connects the front axle stably to the frame to enable the loads on the wheels to be transmitted to the frame. The connecting unit is provided with a shock-absorbing device for elastically disconnecting the front axle from the frame.

9 Claims, 6 Drawing Sheets

STEERING ASSEMBLY FOR A WORK VEHICLE

BACKGROUND OF THE INVENTION

The present invention relates generally to a steering assembly for a work vehicle suitable for use over uneven ground, and more particularly to a steering mechanism for a tractor.

The present invention may be used to advantage on a farm tractor, to which the following description refers purely by way of example.

In farming, wheel-mounted tractors are used for towing mechanical or chemical land processing machinery. The frame, which on recent tractor models comprises the engine block, supports at the front a steering assembly with a rotary T-shaped front shaft. European Patent Application n. EP-A 0.691.258, entitled "Steering mechanism for compact tractors," describes a steering assembly comprising a front axle defined axially by rocking end portions, and a box body connected to the frame by a spherical joint. Each of the rocking end portions carries a direction wheel, and is connected to the box body by a linear actuator by which it is rotated with respect to the axle. The steering assembly also comprises a rod connecting the box body and the frame at the rear wheel end to enable the front axle to oscillate about a horizontal axis; and the rod is connected to the box body by a substantially vertical cylindrical hinge, and to the frame by a spherical joint, so that the rod is mainly subjected to traction. Finally, the steering assembly also comprises a pair of ties, each of which is connected to the frame alongside the spherical joint connecting the box body to the frame and to the respective rocking end portion.

It should be pointed out that the distance between the spherical joint, connecting the axle to the frame, and the axis of the rear wheels is less than the distance between the front and rear wheels; and the ties rotate the axle with respect to the respective spherical joint at each opposed activation of the linear actuators, so that the motion of the direction wheels with respect to the frame is a combination of the rotation of each direction wheel with respect to the corresponding end of the axle, and of the box body with respect to the frame, and provides for maneuvering the vehicle in a very small space.

Such a steering assembly therefore provides for a high degree of maneuverability of the tractor, and for maintaining ground contact of the direction and rear wheels even when traveling over rough ground. On the other hand, however, as the resistance opposed by the terrain to the forward movement of the tractor is transmitted directly to the frame by said rod, which, conversely, transmits the stress on the frame to the axle, the effectiveness of the above steering assembly is reduced over rough ground, in which case handling the tractor is particularly strenuous and may result in the driver becoming distracted through fatigue.

Accordingly, it would be desirable to provide an improved steering mechanism that can be utilized on agricultural tractors.

SUMMARY OF THE INVENTION

It is an object of the present invention to provide a steering assembly for a work vehicle, designed to overcome the aforementioned drawback.

According to the present invention, there is provided a steering assembly for a work vehicle comprising a supporting frame; said assembly comprising a front axle rotating with respect to said frame and comprising an axle defined longitudinally by end portions rocking about respective substantially vertical axes; each said end portion supporting for rotation a direction wheel; said front axle also comprising a box body connected in freely rotating manner to said frame via the interposition of a first spherical joint, and rigidly supporting said axle; and connecting means being provided to connect said front axle stably to said frame and enable the loads on said direction wheels to be transmitted to the frame; characterized in that said connecting means comprise shock-absorbing means for elastically disconnecting said front axle from said frame.

BRIEF DESCRIPTION OF THE DRAWINGS

A number of non-limiting embodiments of the present invention will be described by way of example with reference to the accompanying drawings, in which.

DETAILED DESCRIPTION OF THE PREFERRED EMBODIMENT

Figure 1:
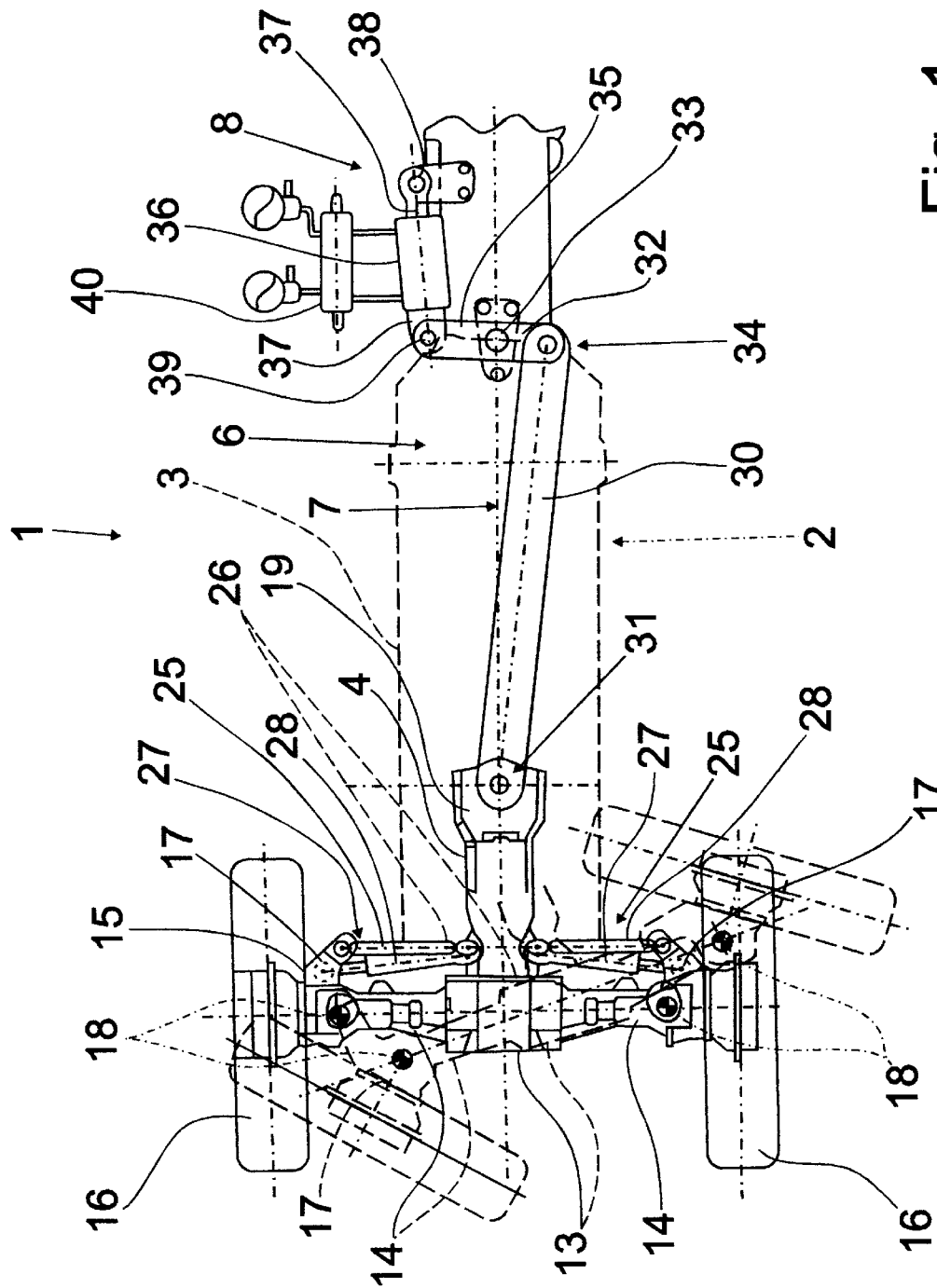
FIG. 1 shows a schematic plan view of a first preferred embodiment of a steering assembly in accordance with the present invention.
Figure 2:
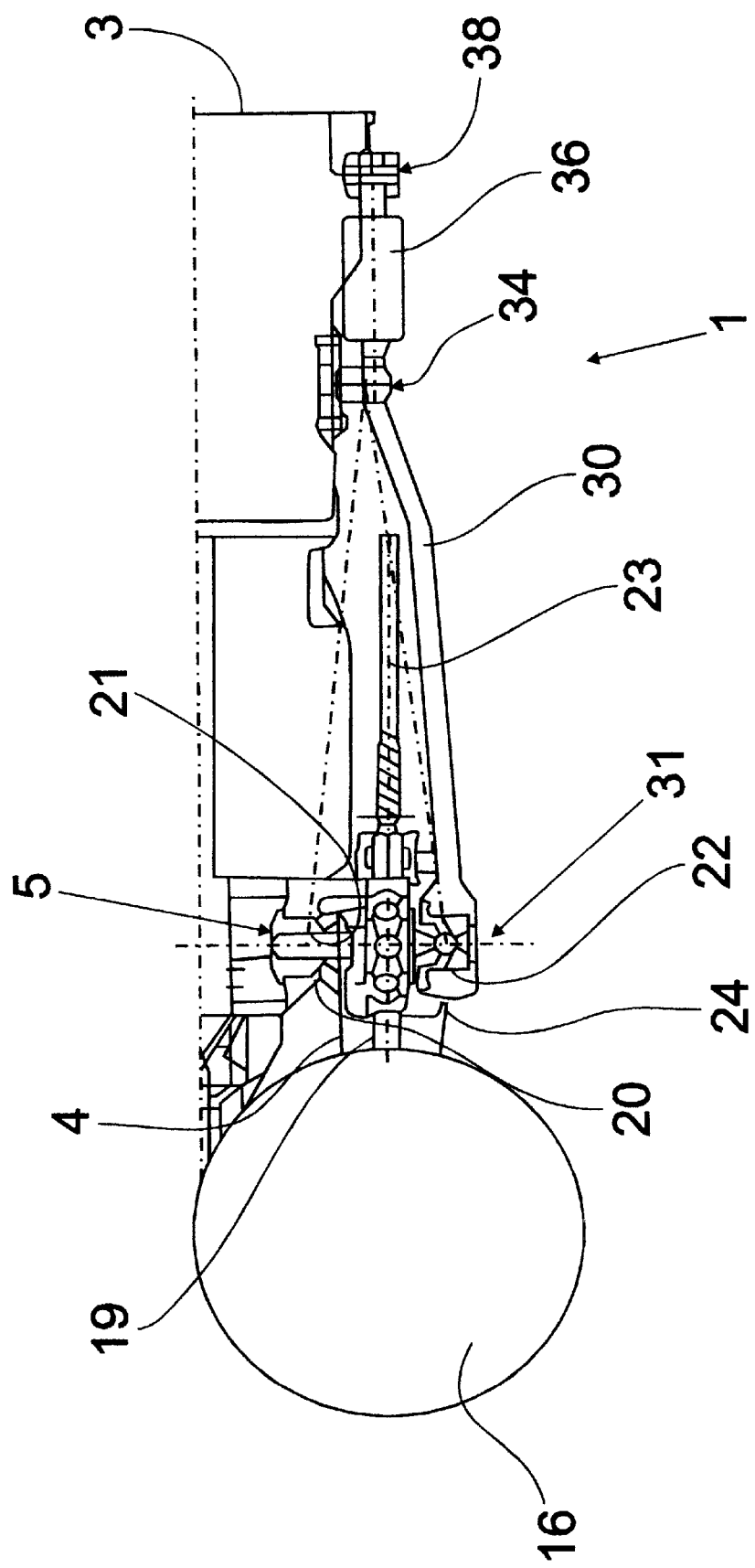
FIG. 2 shows a side view of FIG. 1.

Referring now to FIGS. 1 and 2, a steering mechanism for an agricultural tractor, incorporating the principles of the instant invention, can best be seen. The steering assembly 1 for a work vehicle, such as a tractor 2, is best shown in FIG. 1.

For the sake of simplicity, the steering assembly 1 is shown only partly in the accompanying drawings.

With reference to FIGS. 1 and 2, tractor 2 comprises a longitudinal supporting frame 3, and assembly 1 comprises a T-shaped front axle 4 connected to the underside of frame 3 (FIG. 2) via the interposition of a spherical joint 5. Assembly 1 also comprises a connecting unit 6 located between front axle 4 and frame 3 to support front axle 4, which would otherwise rotate clockwise, in FIG. 2, under the weight of frame 3. Connecting unit 6 provides for transmitting the loads on front axle 4 to frame 3, and comprises an articulated quadrilateral 7, and a shock-absorbing device 8. More specifically, shock-absorbing device 8 cooperates with articulated quadrilateral 7 to disconnect front axle 4 mechanically from frame 3 and provide for smoother load transmission between front axle 4 and frame 3.

With further reference to FIGS. 1 and 2, front axle 4 comprises an axle 13 with two lateral arms 14, each of which is hollow and defined by a respective end portion 15 connected to a direction wheel 16 via the interposition of a rocking body 17 hinged about an axis 18 substantially perpendicular to the corresponding arm 14. Front axle 4 also comprises a box body 19 supporting on top a head 20 of joint 5, which head is engaged inside a cylindrical seat 21 connected rigidly to frame 3. It should be noted that axle 13 (FIG. 2) houses an axle shaft 22, which is driven by a countershaft 23 via a differential 24 housed in box body 19.

Steering assembly 1 also comprises a pair of rods 25, each of which connects one of end portions 15 to a boss 26 facing axle 13, and which frame 3 comprises underneath between wheels 16. More specifically, the two rods 25 together define a constraint 27 causing box body 19 to rotate in the same direction as wheels 16. It should be noted that the combined rotation of wheels 16 about the pivot axis of respective end portions 15 and of box body 19 supporting the end portions greatly reduces the steering radius of tractor 2.

Assembly 1 also comprises a pair of double-acting hydraulic linear actuators 28, each connected to box body 19 and to one of end portions 15, and which are obviously operated in push-pull manner to rotate wheels 16 with respect to box body 19. Constraint 27 causes front axle 4 to rotate about seat 21 of joint 5, to enable tractor 2 to be maneuvered in very little space.

Articulated quadrilateral 7 comprises a connecting rod defined by an elongated body 30 connected to box body 19 by a spherical joint 31 beneath joint 5; a rocker arm defined by the portion of box body 19 between joints 5 and 31; and a further rocker arm defined by a second lever 32 hinged to frame 3 by a further hinge 33 with a vertical axis. Elongated body 30 is end-connected to lever 32 by a spherical joint 34, so that articulated quadrilateral 7 is a spatial type, and the respective frame coincides with frame 3 of tractor 2. It should be noted that, in this case, second lever 32 functions as a known first-class lever.

The second lever 32 has an appendix 35 extending on the opposite side of hinge 33 to spherical joint 34; and shock-absorbing device 8 comprises a known elongated shock absorber 36 having annular portions 37 hinging it to frame 3 and to appendix 35. More specifically, shock absorber 36 is connected to frame 3 on the opposite side of hinge 33 to joint 31 by a hinge 38 with a hinge axis parallel to that of hinge 33, and is connected to lever 32 by a hinge 39 parallel to hinge 38.

With specific reference to FIG. 1, shock absorber 36 is hydropneumatic, and comprises a stiffness regulating member 40 having known hydropneumatic accumulators and for adapting the response of shock absorber 36 to the characteristics of the terrain over which tractor 2 is operated. With reference to FIGS. 1 and 2, it should be noted that elongated body 30 is normally located to the side of, and therefore in no way interferes with, countershaft 23.

The operation of steering assembly 1 is clearly understandable from the foregoing description with no further explanation required. It should be noted, however, that, in response to ground-induced stress on tractor 2, oscillation of front axle 4 about joint 5 is damped by shock-absorber 36, thus providing for smooth operation of tractor 2 over rough ground.

Figure 3:
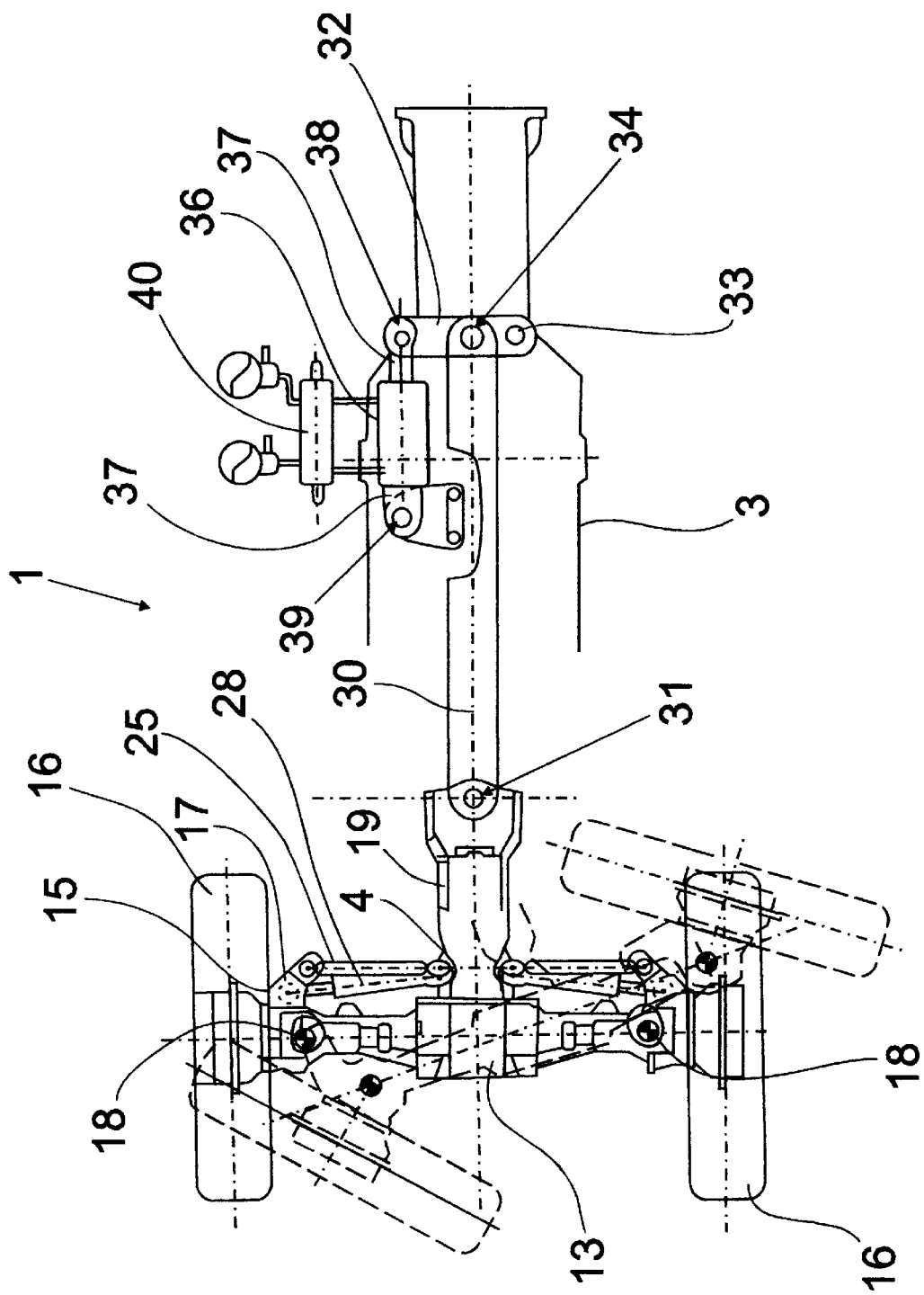
FIG. 3 shows a schematic plan view of a second preferred embodiment of the FIG. 1 assembly.

Clearly, changes may be made to assembly 1 as described and illustrated herein without, however, departing from the scope of the present invention. For example, as shown in FIG. 3, to reduce the stress on shock absorber 36, the locations of joint 34 and hinge 33 are inverted, so that lever 32, which in FIG. 1 is hinged centrally to frame 3, is hinged at the end and operates as a known second-class lever.

Figure 4:
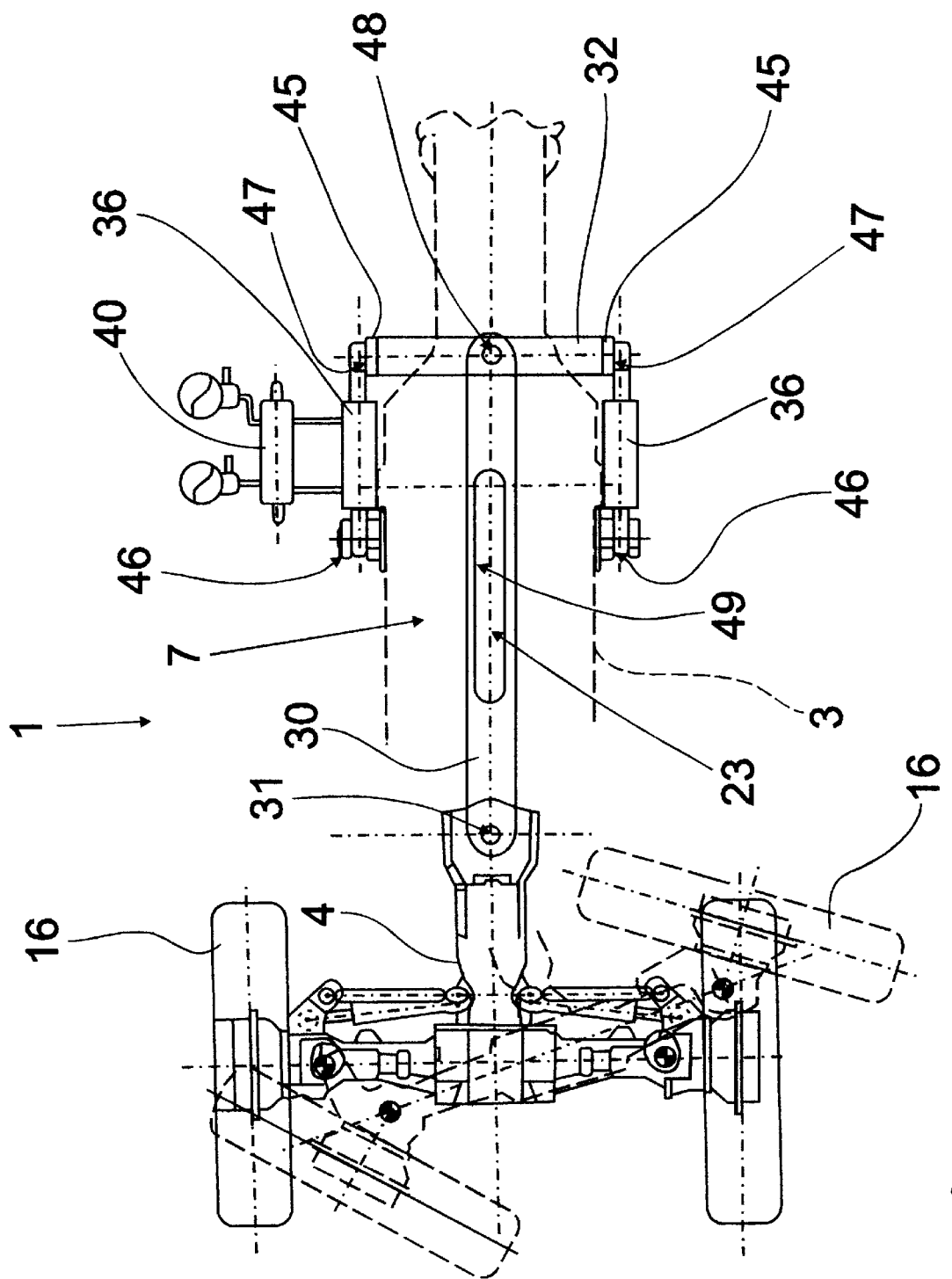
FIG. 4 shows a schematic plan view of a third preferred embodiment of the FIG. 1 assembly.
Figure 5:
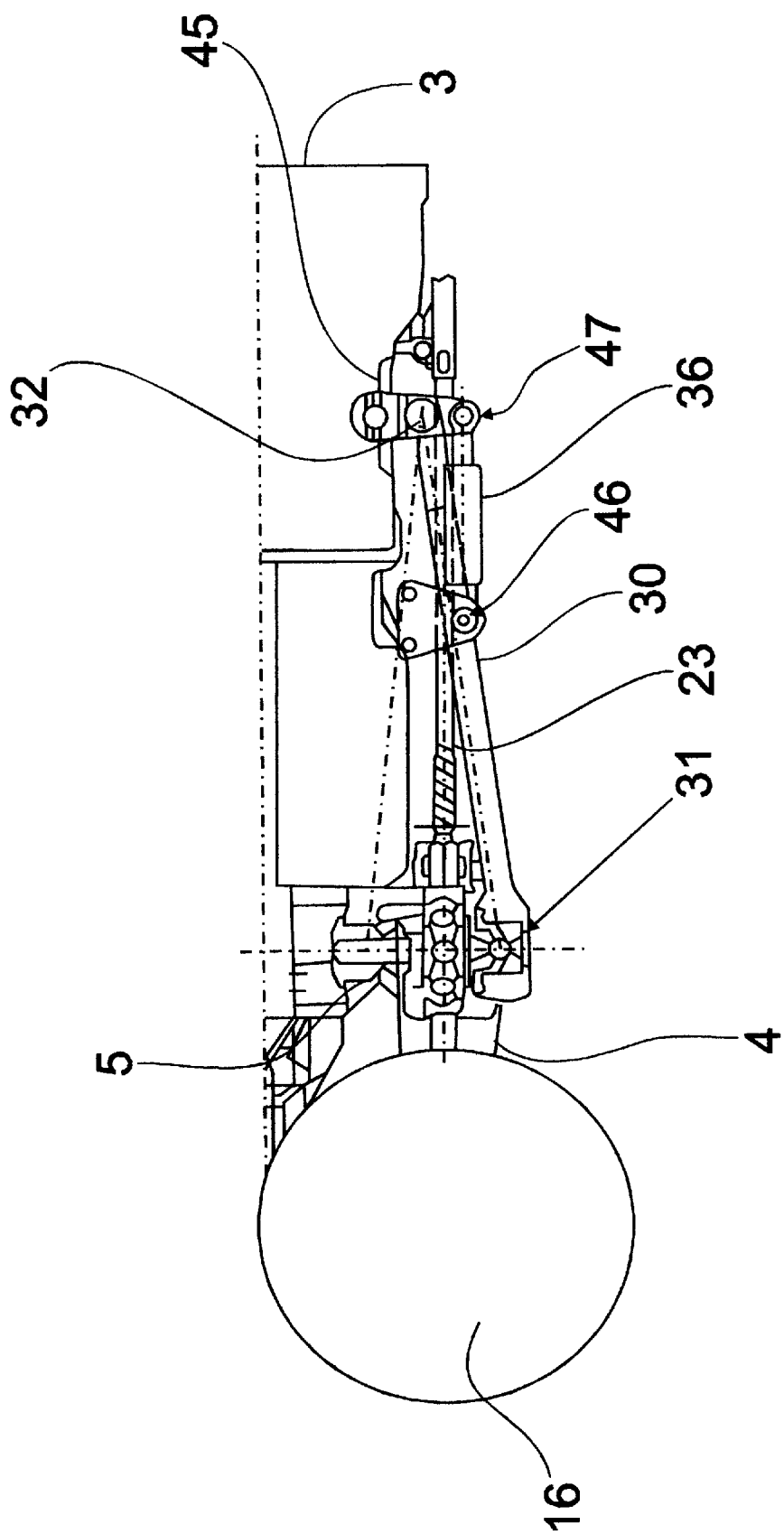
FIG. 5 shows a side view of FIG. 4.

With reference to FIGS. 4 and 5, lever 32 is modified and defined longitudinally by a pair of substantially identical, squarely bent portions 45; frame 3 carries a pair of shock absorbers 36, only one of which is shown with respective regulating member 40 for the sake of simplicity; and each shock absorber 36 is hinged to frame 3 by a horizontal hinge 46, and is connected to one of portions 45 by a hinge 47 parallel to hinge 46. In this case, lever 32 is free from frame 3 and maintained floating by the two shock absorbers 36, and hinge 33 in FIG. 1 is replaced by a spherical joint 48. As shown in FIG. 4, elongated body 30 has a slot 49 engaged longitudinally by countershaft 23.

If necessary, the pair of hydropneumatic shock absorbers 36 may of course be replaced by a pair of springs of equivalent stiffness.

Figure 6:
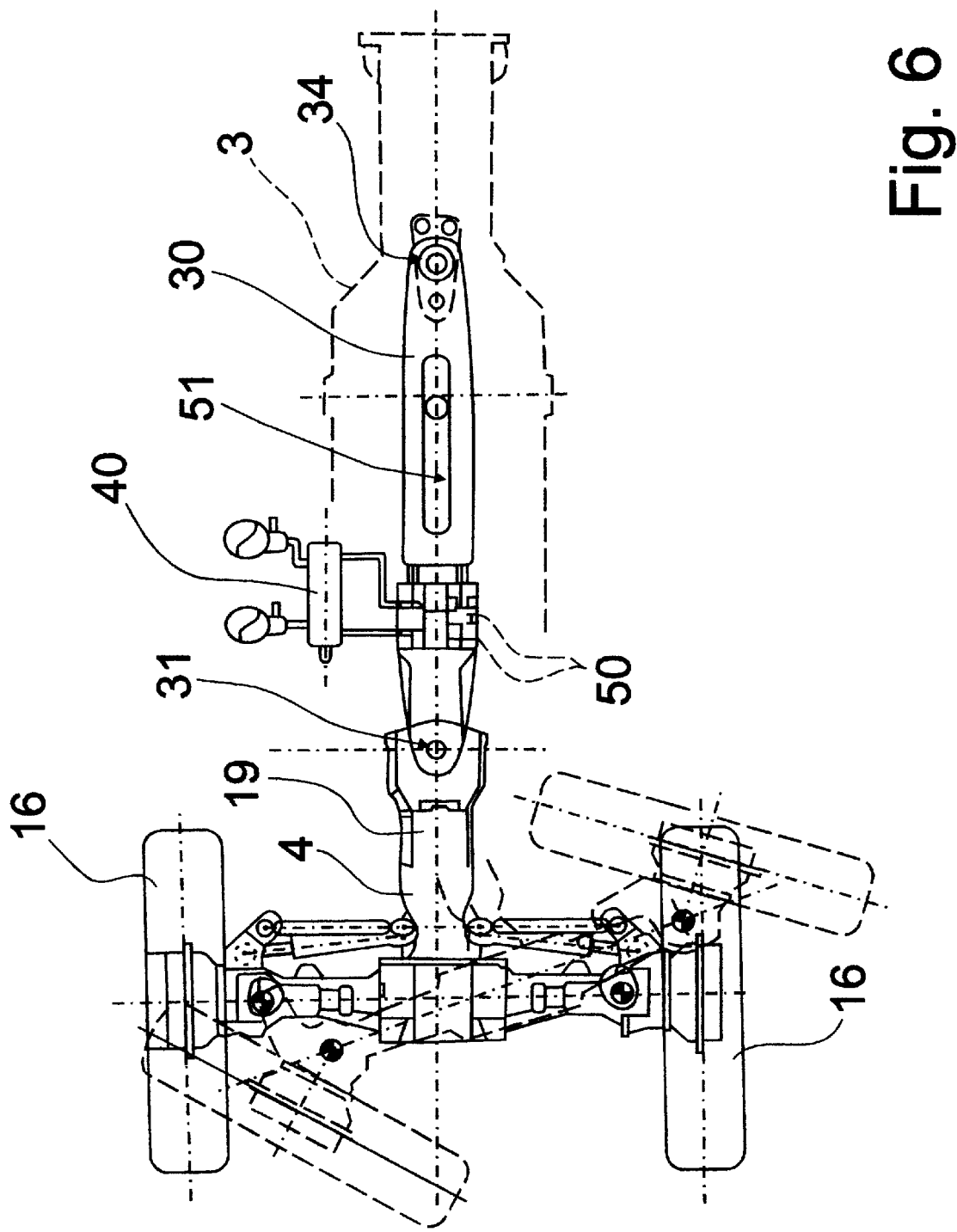
FIG. 6 shows a schematic plan view of a fourth preferred embodiment of the FIG. 1 assembly.

With reference to FIG. 6, assembly 1 is greatly simplified by modifying elongated body 30, which, in a pair of this case, is formed in two parts connected to each other via the interposition of a pair of shock absorbers 50 functionally identical to shock absorbers 36 but obviously smaller in size. Elongated body 30 is connected to frame 3 directly by a spherical joint 34, and has a service slot 51 engaged by countershaft 23.

If necessary, the pair of hydropneumatic shock absorbers 50 may of course be replaced by a pair of springs of roughly equivalent stiffness, or by one spring.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a steering assembly for a work vehicle having a supporting frame; said assembly including a front axle rotating with respect to said name, and being defined longitudinally by end portions rocking about respective substantially vertical axes, each said end portion being supported for rotation a wheel; said front axle also including a box body connected in a freely rotating manner to said fame by a first spherical joint; and connecting means provided to connect said front axle stably to said frame and to enable the loads on said wheels to be transmitted to the frame, the improvement comprising:

said connecting means including a shock-absorbing means for elastically disconnecting said front axle from said frame, a first lever connected to said front axle close to said first spherical joint and a second lever connected to said first lever by a second spherical joint; and control means for rotating said end portions with respect to said box body, said connecting means being a pair of rods, each of which is located between a corresponding said end portion and said frame to cause said front axle to rotate with respect to said first spherical joint while said end portions rotate with respect to said box body, wherein said second lever is connected to said frame on the opposite side of said first spherical joint to said direction wheels by means of a first hinge, said box body and said first and second levers together defining an articulated quadrilateral connected to said frame by said first spherical joint and said first hinge.

2. The steering assembly of claim 1, wherein said shock-absorbing means comprises:

an elongated elastic member connected to said second lever via the interposition of a second hinge to at least partly absorb the load transmitted to said second lever by said first lever.

3. The steering assembly of claim 2, wherein said second spherical joint is located on the opposite side of said first hinge to said second hinge, said second hinge having a substantially vertical fulcrum.

4. The steering assembly of claim 2, wherein said second spherical joint is located between said first and second hinges, said second hinge having a substantially vertical fulcrum.

5. The steering assembly of claim 4, wherein said elastic member comprises a hydropneumatic shock absorber of adjustable stiffness.

6. The steering assembly of claim 2, wherein said elastic member is of adjustable stiffness.

7. The steering assembly of claim 1, wherein said second lever is defined longitudinally by two squarely bent portions, each of which is connected to said frame by an elongated elastic member forming part of said shock-absorbing means and hinged to the frame about a substantially horizontal axis.

8. The steering assembly of claim 1, wherein said shock-absorbing means comprise an elongated body connected to said frame by a second spherical joint on the opposite side of said first spherical joint to said direction wheels, said elongated body being hinged to said box body close to said first spherical joint, and said elongated body being formed in at least two parts connected elastically to each other to elastically disconnect said box body and said frame.

9. The steering assembly of claim 8, wherein said first lever is connected to said box body by a third spherical joint.

* * * * *